United States Patent [19]

Velicki

[11] Patent Number: 5,384,959
[45] Date of Patent: Jan. 31, 1995

[54] METHOD OF MAKING A SPF/DB HOLLOW CORE FAN BLADE

[75] Inventor: Alexander Velicki, Garden Grove, Calif.

[73] Assignee: McDonnell Douglas Corporation, Huntington Beach, Calif.

[21] Appl. No.: 69,389

[22] Filed: Jun. 1, 1993

Related U.S. Application Data

[62] Division of Ser. No. 738,270, Jul. 31, 1991, Pat. No. 5,240,376.

[51] Int. Cl.$^6$ .............................................. B23P 15/00
[52] U.S. Cl. ........................... 29/889.72; 29/889.721; 29/889.71; 416/229 A
[58] Field of Search ........... 29/889.72, 889.7, 889.721, 29/889.71; 228/157; 416/223 A, 224, 226, 232, 233, 241 R

[56] References Cited

U.S. PATENT DOCUMENTS

| | | | |
|---|---|---|---|
| 3,002,265 | 10/1967 | Stalker | 29/889.72 |
| 3,044,152 | 7/1962 | Stalker | 29/889.72 |
| 3,058,202 | 10/1962 | Stalker | 29/889.72 |
| 3,135,486 | 6/1964 | Wing | 29/889.72 |
| 3,200,477 | 8/1965 | Shultz | 29/889.72 |
| 3,623,204 | 11/1971 | Wagle . | |
| 4,043,498 | 8/1977 | Conn, Jr. | 228/157 |
| 4,217,397 | 8/1980 | Hayase et al. | 228/157 |
| 4,882,823 | 11/1989 | Weisert et al. | 228/157 |
| 4,934,580 | 6/1990 | Sutton | 228/157 |
| 5,072,871 | 12/1991 | Moracz et al. | 228/193 |
| 5,083,371 | 1/1992 | Leibfried et al. | 29/889.72 |
| 5,099,573 | 3/1992 | Krauss et al. | 29/889.2 |

Primary Examiner—Irene Cuda
Attorney, Agent, or Firm—Donald E. Stout; John P. Scholl

[57] ABSTRACT

A hollow core fan blade for a gas turbine engine, having a continuous leading edge, is fabricated using a four-sheet superplastic forming/diffusion bonding process which results in a cost-efficient and lightweight, yet strong, structure. The rotor blade is comprised of a face sheet which has a 180 degree bend therein so that the two face sheet ends are aligned. Bonded to opposing sides of the face sheet are first and second core sheets, between which is the hollow core. To fabricate the blade, a core sheet assembly is inserted inside the prepared face sheet, thereby forming a Ti-Pack (titanium pack) assembly having a plurality of pressure-tight cells. The Ti-Pack is inserted into a cavity within a die, after which the rotor blade, having predetermined design characteristics, is superplastically formed by heating the die and selectively pressurizing the plurality of cells.

7 Claims, 7 Drawing Sheets

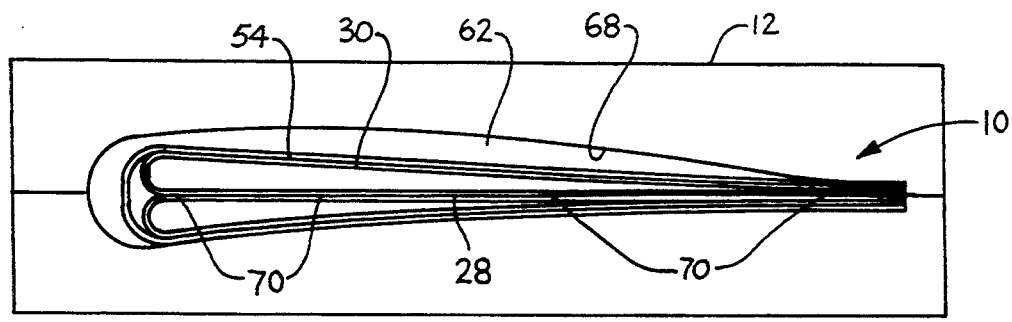
FIG. 10
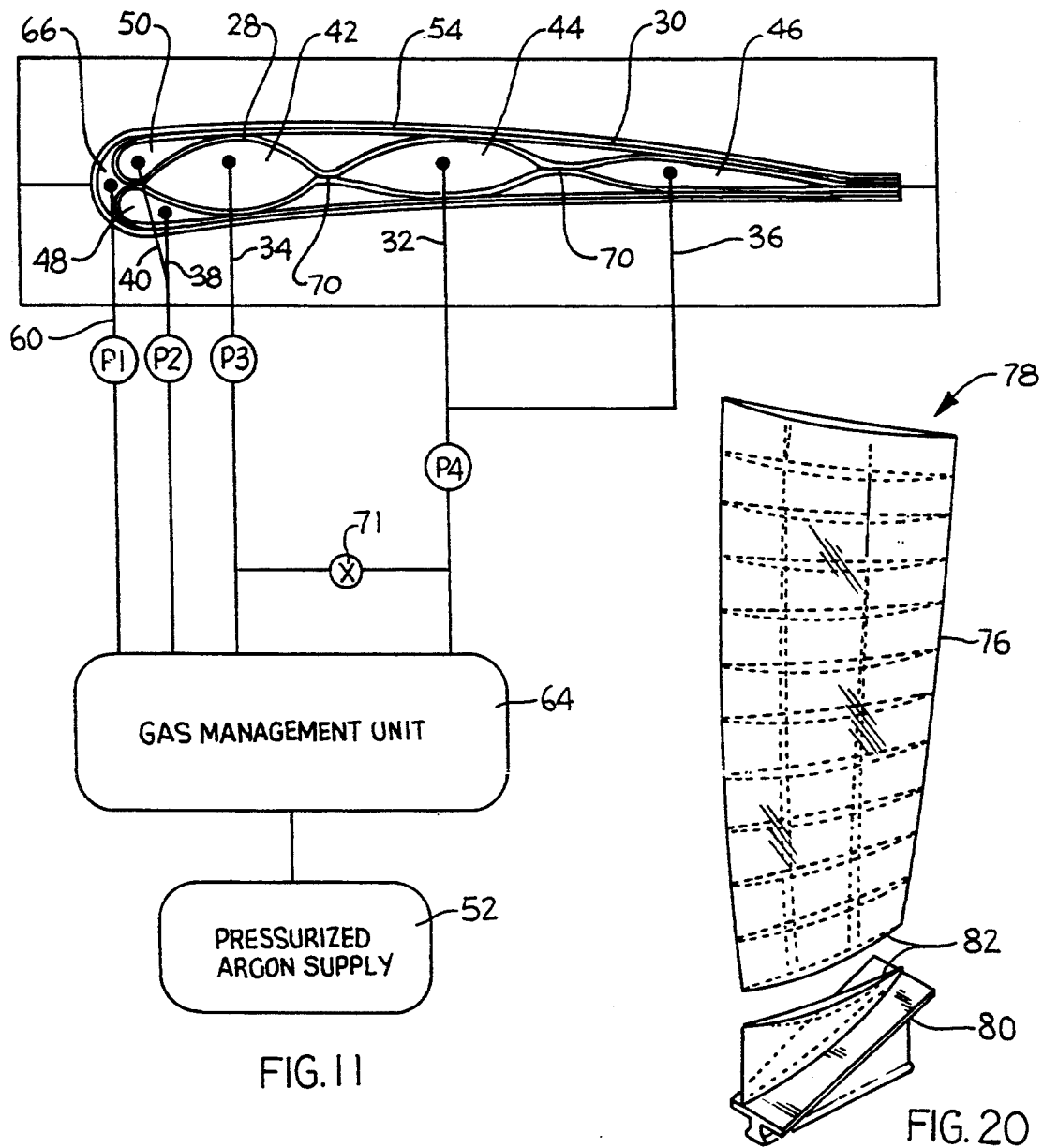
FIG. 11
FIG. 20

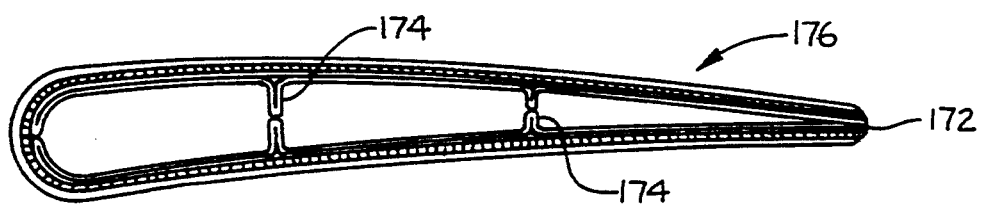
FIG. 24
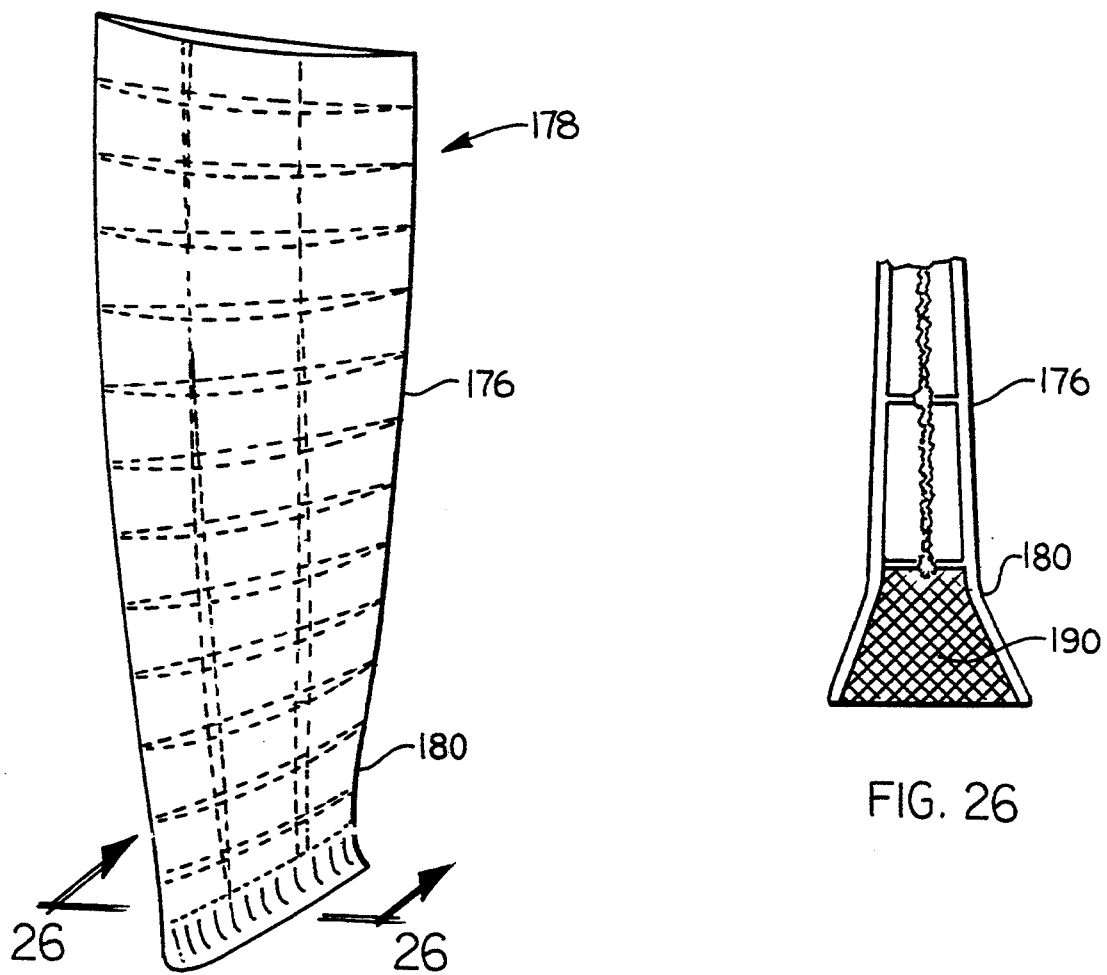
FIG. 25
FIG. 26

METHOD OF MAKING A SPF/DB HOLLOW CORE FAN BLADE

This is a division of application Ser. No. 07/738,270, filed Jul. 31, 1991 now U.S. Pat. No. 5,240,376.

BACKGROUND OF THE INVENTION

This invention relates to the production of hollow-core structures, and more particularly to the production of a superplastically formed/diffusion bonded hollow core rotor blade for a gas turbine engine, especially a fan blade, and the procedure for producing such a blade.

Superplasticity is the characteristic demonstrated by certain metals to develop unusually high tensile elongations with minimum necking when deformed within a limited temperature and strain rate range. This characteristic, peculiar to certain metal and metal alloys, has been known in the art as applied to the production of complex shapes. It is further known that at these same superplastic forming temperatures the same materials can be diffusion bonded with the application of pressure at contacting surfaces. One particularly well known process for producing superplastically formed structures, known as the "four sheet process", is described in U.S. Pat. No. 4,217,397, assigned to the McDonnell Douglas Corporation, and herein incorporated by reference.

In a continuing effort to improve gas turbine engine operating efficiencies, as well as to permit the development of transport aircraft having greater passenger and cargo capacities, engine manufacturers have been designing increasingly larger engines. These new generation engines, known as "high-bypass engines" or "very high bypass engines", typically operate with a bypass ratio approaching or exceeding 80%, meaning that 80% or more of the total airflow into the engine bypasses the core engine (consisting of the compressor, combustor, and at least the high pressure turbine) and instead flows only through the surrounding fan section, which includes the fan blades and perhaps the low pressure turbine. In a high-bypass engine, most of the generated thrust is derived from the bypass air, enabling higher fuel efficiency and the lower noise output necessary to meet increasingly stringent noise regulations. As a result, engine fan diameters continue to increase in size, and it becomes ever more critical to reduce the structural weight and dynamic loading in the rotating portions of the engine. Estimates are that an effective hollow core fan blade design for a typical large high bypass engine would reduce engine weight by 150 pounds, which would in turn reduce specific fuel consumption by about 5%. As future engine fan diameters increase, it becomes even more critical to reduce the structural weight and dynamic loading in the rotating portions of the engine.

Current fan blade configurations are fabricated from solid titanium materials. This is due to manufacturing cost considerations, as opposed to structural load requirements. Therefore, if a cost effective titanium hollow core fan blade could be manufactured, it would be able to meet the structural load criteria for safe operation. Dynamic loads within the engine core would also be reduced with the reduction in blade mass, which would in turn allow the entire engine core to be further optimized. Future engine growth would occur without requiring the costly redesign of core sections.

It is known in the prior art to manufacture hollow core fan blades for large gas turbine engines by machining matching cavities in titanium plates, then diffusion bonding a honeycomb core inside the cavity. However, this is an extremely expensive process and the resulting blade tends to be vulnerable to damage, in part because it has a discontinuous leading edge. What is needed, therefore, is a hollow core fan blade which may be manufactured by a cost efficient superplastic forming-/diffusion bonding (SPF/DB) process, and which is more damage tolerant than currently known hollow core blades.

SUMMARY OF THE INVENTION

This invention solves the problem outlined above by providing a hollow core rotor blade for a turbine engine which may be relatively easily manufactured by an inventive and cost efficient SPF/DB process. The rotor blade comprises a face sheet which has a first surface and a second surface and which further has a first end and a second end. The face sheet is fabricated to have an approximately 180 degree bend therein so that the first end and the second end are substantially aligned. Therefore, the first surface of the face sheet becomes the inner surface of the fabricated face sheet. The rotor blade further comprises first and second core sheets, with the first core sheet being bonded to a first portion of the face sheet inner surface and the second core sheet being bonded to a second portion of the face sheet inner surface. The first and second portions of the face sheet inner surface are opposed to one another, i.e. they face one another because of the 180 degree bend. The rotor blade further includes a hollow core spacing between the first and second sheets, which serves to advantageously render the blade much lighter than conventional solid blades, while retaining tremendous strength.

At least one and preferably a plurality of structural webs extend within the hollow core spacing of the blade. One advantage of the inventive process is that the webs may be oriented either vertically or horizontally, or both. The rotor blade is preferably a fan blade for a gas turbine engine, although other applications are possible.

Another major advantage of the invention is that the leading edge is continuous, since the face sheet outer surface also comprises the outer surface of the rotor blade, with the leading edge being located substantially at the point of the 180 degree bend on the face sheet.

In another aspect of the invention, a rotor blade assembly for a turbine engine is disclosed, which includes the above-described rotor blade as well as a root section, with the rotor blade being mounted on the root section. Preferably, the root section is a hollow, flared out portion of the blade itself, with the hollow portion being filed with a solid material filler.

In yet another aspect of the invention, a method of fabricating a rotor blade for a turbine engine comprises the steps of preparing a core sheet assembly and preparing a face sheet having a first edge and a second edge. The face sheet is bent approximately 180 degrees at its centerline, such that the first and second edges are aligned. Then, the core sheet assembly is inserted inside the prepared face sheet, thereby forming a Ti-Pack (Titanium Pack) assembly having a plurality of pressure-tight cells. The Ti-Pack is inserted into a cavity within a die, after which the rotor blade, having predetermined design characteristics, is superplastically formed by heating the die and selectively pressurizing the plurality of cells.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 10 is a cross-sectional elevational view showing the assembled Ti-Pack within the forming die;

FIG. 11 is a cross-sectional elevational view similar to FIG. 10 showing the gas management system for ensuring proper gas flow into each of the cells of the Ti-Pack;

FIG. 20 is a perspective view of the fan blade assembly of the invention after the fan blade has been attached to the machined root section.

FIG. 24 is a cross-sectional view similar to FIG. 19 of the trimmed fan blade as formed in the alternative embodiment of FIG. 21;

FIG. 25 is a perspective view similar to FIG. 20 of an alternative embodiment fan blade assembly; and FIG. 26 is a cross-sectional view taken along lines 26—26 of FIG. 25 showing details of the blade root section.

DETAILED DESCRIPTION OF THE INVENTION

As indicated above, the material to be superplastically formed must exhibit the characteristics of unusually high tensile elongation with minimum necking when deformed within a limited temperature and strain rate range. While several materials demonstrate these superplastic properties, titanium and its alloys are currently the best known forming materials. The superplastic temperature range varies with the specific alloy used, however, the temperature just below the phase transformation temperature is near optimum. This temperature for titanium alloys is near 1700° F. The best strain rate is actually determined experimentally for each configuration formed, in order to produce balanced deformation. If the strain rate is too rapid, it will cause blowout of the material being deformed, and if the rate is too slow, the material loses some of its plasticity.

In addition to the superplastic properties, the material to be formed must be suitable for diffusion bonding. Diffusion bonding, as used herein, refers to the solid-state joining of the surfaces of similar or dissimilar metals by applying heat and pressure for a time duration to cause co-mingling of the atoms at the joint interface.

The inventive process for manufacturing the hollow core fan blade of the invention, disclosed herein, is a variant of the four-sheet process disclosed in U.S. Pat. No. 4,217,397, herein incorporated by reference, as noted above. The first step is to fabricate a Titanium-Pack, or "Ti-Pack" 10, for insertion into a die 12 (see FIG. 10). Then, the next step is to initiate the SPF/DB process, so that the Ti-Pack 10 will be formed into a fan blade having the desired characteristics.

Ti-Pack Fabrication

Figure 1:
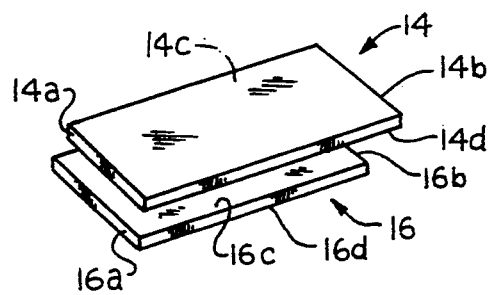
FIGS. 1–4 are perspective views showing sequentially the steps for preparing the core sheets which form in part the Titanium-Pack (Ti-Pack) of the invention.
Figure 2:
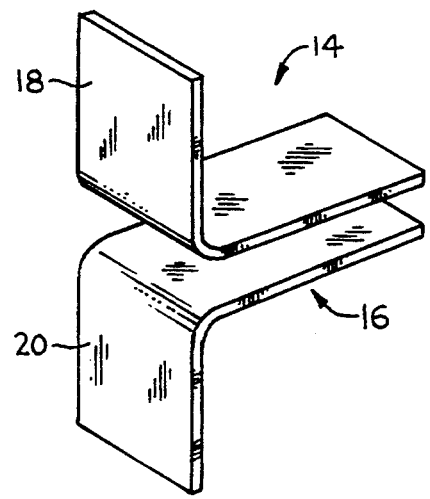
Figure 3:
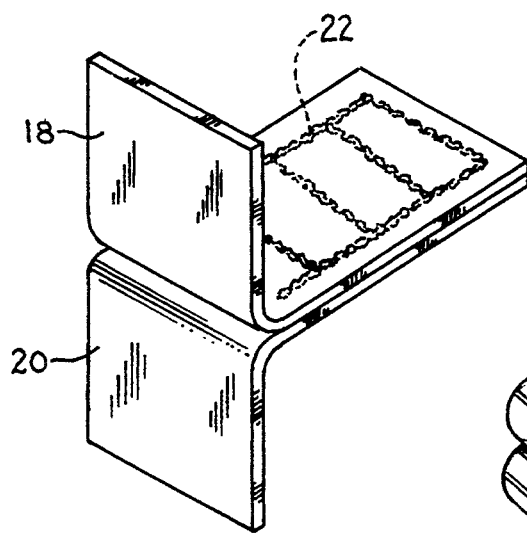
Figure 4:
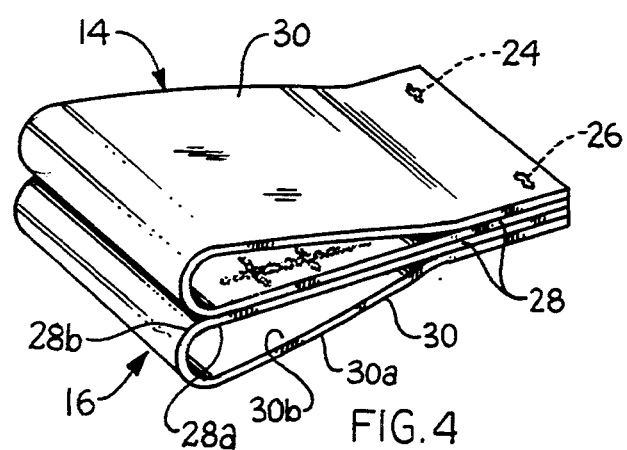

The Ti-Pack 10 comprises all of the structural members in their sheet metal form, and a series of gas inlet tubes that will be used to supply the gas pressure necessary for the subsequent hot forming operation. Referring to FIGS. 1–4, Ti-Pack assembly is initiated by preparing the core sheets which form a part of the Ti-Pack. Two sheets 14, 16, which in the preferred embodiment comprise 0.040 inch thick sheets of Ti-6Al-4V material, are trimmed to the proper perimeter dimensions for ensuring a resultant fan blade of the desired size. Core sheet 14 has first and second ends 14a and 14b, respectively, as well as first and second surfaces 14c and 14d, respectively. Similarly, core sheet 16 has ends 16a and 16b as well as surfaces 16c and 16d. One end portion 18, 20 of each sheet 14, 16, respectively, is then bent approximately 90° to form an L shaped cross-section, as shown in FIG. 2. The sheets 14, 16 are then cleaned and placed back to back for a roll seam welding operation. A rectangular grid pattern of intermittent spotwelds 22 is rolled onto the sheets to attach them together, although of course a grid pattern of any desired shape could be employed. The location of these welds dictates the final internal web geometry of the blade structure, as will be explained in further detail hereinbelow. After the intermittent spotwelds are completed, the perimeters of the core sheets are continuously spotwelded, except at locations where gas inlets are to be installed, to provide a pressure tight seal that will contain the core gases during forming. Following this, the core sheets 14, 16 are folded back and tack welded at points 24 and 26 to hold them in place, as shown in FIG. 4. At this point, each core sheet 14, 16 comprises both an inner core sheet section 28 and an outer core sheet section 30. The inner core sheet sections 28 each have an outer surface 28a and an inner surface 28b, while the outer core sheet sections 30 also each have an outer surface 30a and an inner surface 30b.

Figure 8:
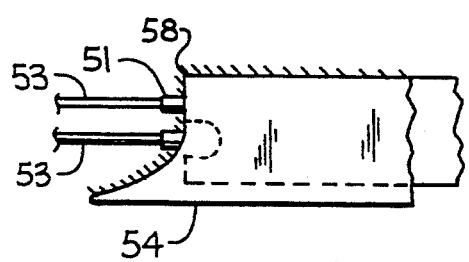
FIG. 8 is a cross-sectional view along lines 8—8 of FIG. 7, showing details of the gas inlet arrangement into the face sheet and the outer core sheets of the Ti-Pack.
Figure 9:
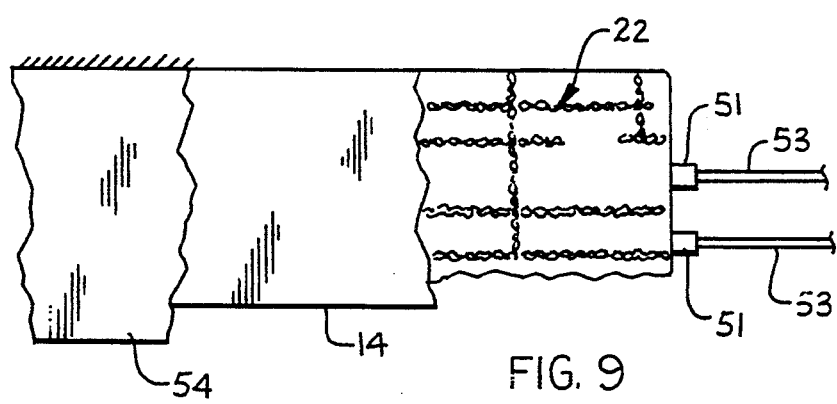
FIG. 9 is a cross-sectional view along lines 9—9 of FIG. 7, showing details of the gas inlet arrangement to the inner core sheets of the Ti-Pack.

Gas inlets 32, 34, 36, 38, and 40 are now installed in the core sheets, as particularly shown in FIGS. 8, 9, and 11. One inlet is required for each of the cells 42, 44, 46, 48, and 50 formed by the grid pattern of spotwelds 22 within the core sheets 14 and 16. Actually, inlets 32 and 36 comprise a single inlet, since they are both directly connected to pressure regulator P4, and cells 44 and 46 will function as a single cell since they will be at identical pressures. Shown particularly in FIGS. 8 and 9, for each inlet a small titanium fitting 51 is used to spread the core sheets 14, 16 apart to provide a gas passage. Onto this fitting a titanium tube (not shown) is fusion welded to connect the Ti-Pack 10 and a gas source 52. A steel tube 53 is then used as a collar to prevent the titanium tube from expanding under the gas pressure during the hot forming operation.

Once the edges of the area around the titanium fitting and the core sheets 14, 16 are sealed by fusion welding the sheets together, the core sheets 14, 16 are leak checked to insure that they are pressure tight. It is critical to find and repair any leaks, since leaks present in the core will prevent the core from maintaining a positive pressure and will result in part failures.

Figure 5:
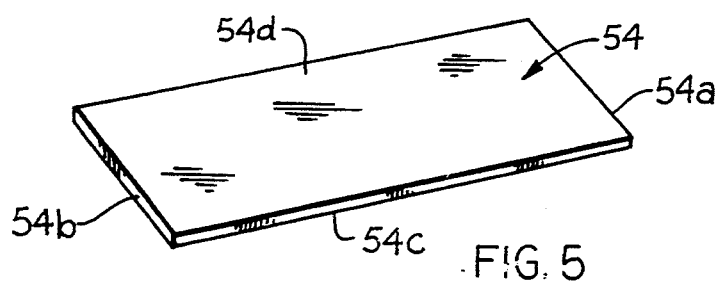
FIGS. 5 and 6 are perspective views showing sequentially the steps for preparing the face sheet which forms in part the Ti-Pack of the invention.
Figure 6:
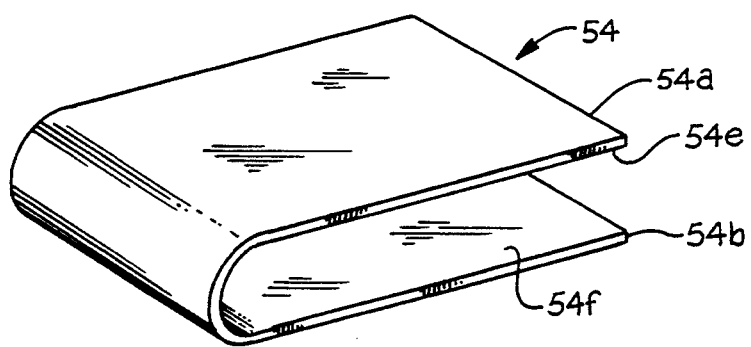
Figure 7:
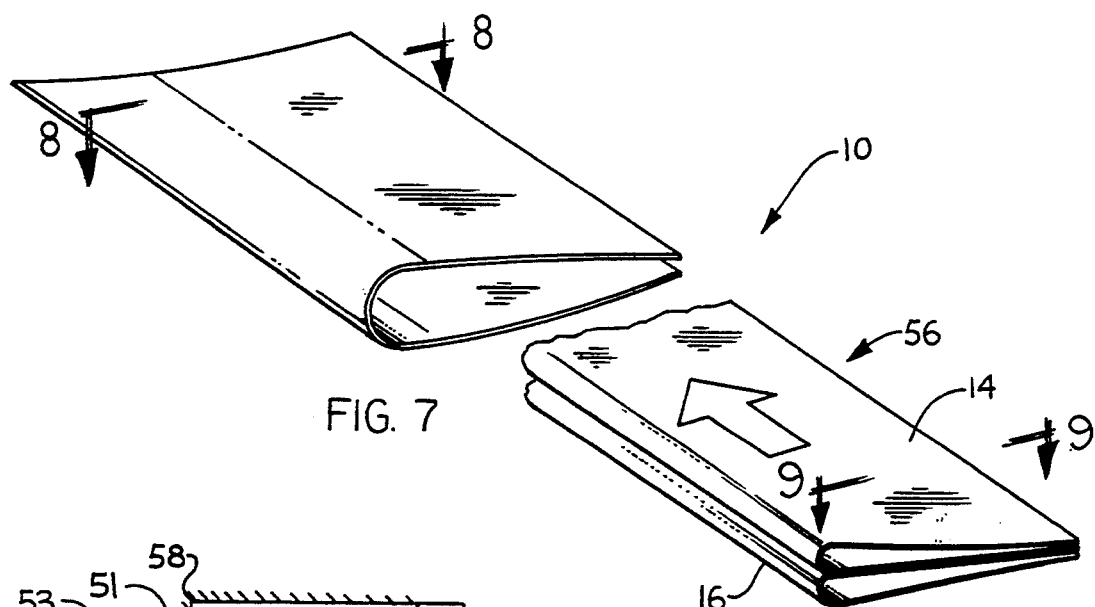
FIG. 7 is a perspective view showing the assembly of the Ti-Pack of the invention wherein the core sheets are slid into the face sheet.

Assembly of the core sheets 14, 16 is essentially complete at this stage, and preparation of the face sheet 54, shown in FIGS. 5 and 6, now may begin. In the preferred embodiment, the face sheet is a 0.050 inch thick sheet of Ti-6Al-4V, which is trimmed to the proper dimensions and mechanically bent at the sheet centerline 180 degrees so that the edges 54a and 54b of the sheet opposite of the bent radius line are aligned, as shown in FIG. 6. The face sheet 54 has a first, or inner, surface 54c and a second, or outer surface 54d. Due to the material springback effects the edges will have a tendency to open, but this is not a problem. Once formed, the face sheet 54 should be etched to provide a clean surface for bonding. The core sheet assembly 56 may now be placed inside the face sheet 54, as shown in FIG. 7, so that the trailing edges of all the sheets line up. Once assembled, the first core sheet 14 is bonded to a first portion 54e of the face sheet inner surface 54c, while the second core sheet 16 is bonded to a second portion 54f of the face sheet inner surface. Face sheet inner surfaces 54e and 54f oppose one another. The periphery of the assembled Ti-Pack 10 is then welded closed in order to provide a sealed bladder that contains the sealed core sheet assembly 56 within it. To accomplish this, the edges of the Ti-Pack assembly 10 are fusion welded together except at each of the gas inlet locations for the core sheet and the face sheet, the fusion welded edge 58 being shown in FIG. 8. Gas inlets 60 (see FIG. 11) for the face sheet 54 are installed in a manner similar to those of the core sheets 14, 16. Gaps around the gas inlets must also be carefully welded to seal the face sheet pressures. The entire Ti-Pack assembly 10 can now be leak checked to verify the integrity of the welding. Once the Ti-Pack assembly is pressure tight, it can be certified as completed and placed into a steel die 12 for the hot forming operation (FIG. 10).

Hot Forming Operation

During the hot forming operation, the titanium sheets are superplastically formed into the final part geometry. This is accomplished by placing the Ti-Pack 10 inside a cavity 62 within the steel die 12, the die 12 then being mounted inside a heated platen press (not shown). By controlling the pressure, temperature and the relative time at each of these variables the formation of the structure can be dictated by the weld patterns imposed on the Ti-Pack sheets. Forming takes place by pressurizing the individual bladder systems, or cells, within the Ti-Pack 10. The forces generated on the titanium sheets cause them to expand and elongate until they fill the cavity 62, coming in contact with the tool surface. Flow stresses of the sheets are controlled as a function of the gas pressure feed to the gas inlets and by the temperature inputs to the tool. By following a mathematically determined schedule for manipulating the gas pressure and die temperature as a function of time, the internal geometry of the blade structure can be controlled within the material's superplastic limits.

The gas management system for the inner core sheet sections 28, the outer core sheet sections 30, and the face sheet 54 is a rather complex network. The configuration shown in FIG. 11 is derived from the requirement that each of the bladders, or cells, mentioned above must form at different rates relative to one another. In this configuration, the gas source 52 supplies a gas (preferably welding grade argon gas because it is inert and will not contaminate the highly reactive titanium at elevated temperatures) to a gas management unit 64. Gas management unit 64 acts as a control unit for directing gas flow through each of the pressure regulators P1, P2, P3, and P4 to the respective cells 66, 48 and 50, 42, and 44 and 46. The gas pressure to the face sheet cell 66 is controlled by regulator P1, P2 controls pressure to core cells 48 and 50, P3 controls pressure to core cell 42, and regulator P4 controls pressure to core cells 44 and 46. The gas management unit 64 may comprise any known control means for selectively directing gas flow to each of the pressure regulators on a time-dependent basis, in accordance with the control parameters set forth in detail below. The most important criteria is to maintain the equilibrium of forces within the Ti-Pack 10.

Figure 12:
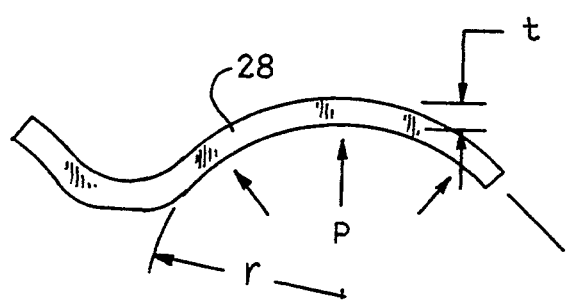
FIG. 12 is a diagrammatic view showing the pressurized cell geometry for a typical cell during the superplastic forming process of the invention.

The fundamental equation that governs the forming rate for each of the individual cells is simply the hoop stress equation modified to account for the transient nature of superplastic forming, where the cell radius r and the material thickness t are constantly changing with respect to time. FIG. 12 shows a portion of a pressurized cell geometry for an inner core sheet section 28, depicting the pressure (P), radius (r), and thickness (t) parameters. The hoop stress equation is as follows:

$$\text{Hoop Stress} = (\text{Pressure} * \text{radius})/\text{thickness} \tag{1}$$

This equation is valid until the cell touches the expanded face sheet, after which each side of the cell forms an individual corner radius.

The allowable dynamic stress is a function of the die temperature and the strain rate sensitivity for the Ti- Pack material (Ti-6Al-4V in the preferred embodiment) at its forming temperature. To calculate the geometry changes, the stress variable is replaced with the strain rate multiplied by the material modulus. The strain rate sensitivities for materials are well documented in the technical literature and can be calculated for specific materials by performing a "Cone Forming" test to establish this constant. Once the variables have been calculated, the equation can be rewritten as a function of the input variable, pressure, with respect to time:

$$P(t) = (radius/thickness) * (modulus) * (strain\ constant) \qquad (2)$$

The pressure input can now be plotted over time by calculating the changes in sheet thickness and cell radii. These changes also dictate the rate of forming within the internal cell geometry so that the degree of forming can be predicted mathematically. By predicting the shape of the internal cells the new information can be continuously updated and input back into the equations to develop the required forming parameter inputs.

The range that the strain rate must be kept is critical because if the rate is either too fast or too slow the material will experience excessive thinning and a rupture will occur. Calculating the pressure inputs to stay within the superplastic strain rate of a given material at the varying cell heights and material thicknesses is an empirical task, depending upon the specific material being utilized and the specific finished configuration desired, and involves fairly extensive, though routine, computer modeling.

Figure 13:
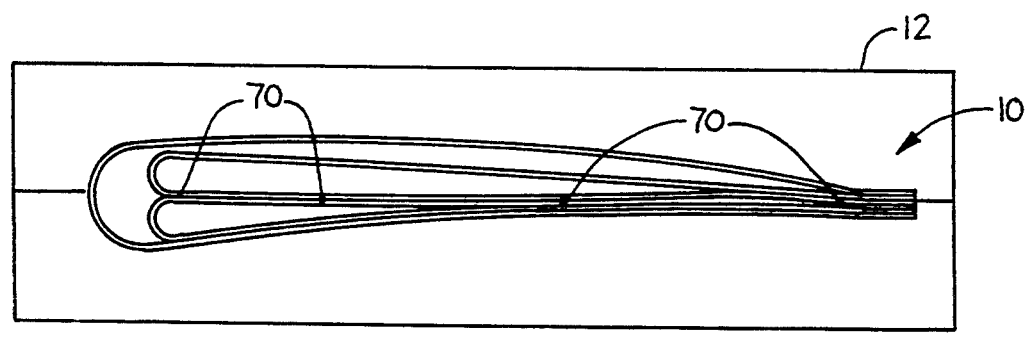
FIG. 13 is a cross-sectional elevational view similar to FIG. 10 showing the formation of the face sheet during the superplastic forming process of the invention.

Having established the pressure schedule by mathematical means the Ti-Pack 10 may now be loaded into the machined steel die 12. The die 12 has the desired external blade geometry as its internal cavity 62. The die is then sprayed with a release agent such as Boron Nitrate which facilitates removal of the finished blade after forming. Each of the gas inlet lines are capable, by means of the gas management unit 64, of adding or venting pressure between the core sheets and between the face sheet inlet lines. Once the part and die are securely loaded into the tool, the hydraulic pressure of the press must be adjusted to maintain a pressure differential between the internal die cavity 62 and the external face of the die to keep the die closed. The input temperature to the die 12 is increased from a loading temperature which may range about 500° F., at a rate of about 3 degrees per minute, until the ideal forming temperature (about 1650° for Ti-6Al-4V) is achieved Typically, as the forming temperature is ramped up, the pressure in the face sheet cavity 66 is increased to initiate forming. The geometric simplicity and lack of superplastic straining involved with pushing the face sheet 54 out to the die contour (the interior walls 68 of the die which define the cavity 62) allows the operator the option of initiating the forming at lower temperatures that have a narrower superplastic strain rate sensitivity band. Although predicting the forming history of the face sheet is more difficult at lower nonconstant temperatures, the lack of overall material elongation increases the margin for successful forming. FIG. 13 shows the face sheet 54 formed out to the die surface 68.

As the face sheet 54 forms, pressure in the core sheets 14, 16 is held at a constant value by the gas management unit 64 until the optimum temperature is reached. Adequate pressure is held to keep the sheets apart and prevent the inside surfaces from sticking. As the temperature approaches 1600° F. the pressure in the core cells is increased. Wherever there is a row of spotwelds 22, a reaction point is provided for the core sheets 14, 16 to wrap back around the weld nugget 70, as the pressure in the core cells increases, thereby developing a web or spar at that location. Thus, the location of these weld nuggets 70 dictates the final internal web geometry of the blade structure. It is important to note that, as shown in FIG. 3, the spotwelds run in both the vertical and horizontal direction. Thus, both vertical and horizontal webs may be formed by the above described process, depending upon whether a vertically or horizontally oriented weld nugget is involved, though only the formation of vertical webs is shown in the figures depicting the fabrication process for the sake of simplicity. The relative pressure differential between each of the core cells is a critical parameter that must be maintained so that movement of the web location does not occur. Unlike the typical four sheet core arrangement, the core sheets used to form the fan blade have more than one pressure for the core sheets. This is required to balance the core force system, as the reactions at the weld nuggets 70 tend to pull the web in the direction of the smaller cell. Valves such as valve 71 between pressure regulators P3 and P4 may be provided between the gas input lines in order to permit equalized pressurization of all or some of the cells in the event that differential pressurization is not necessary in a particular application.

Figure 14:
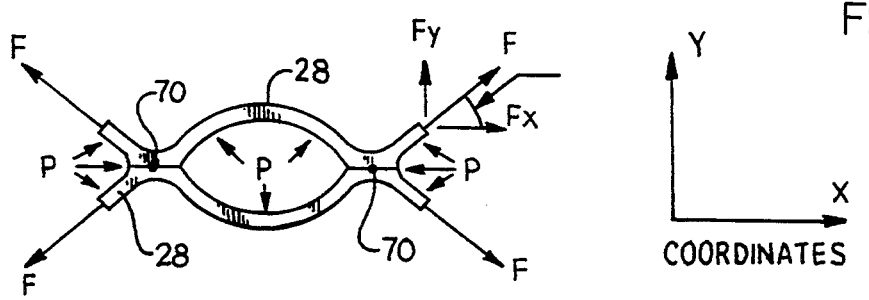
FIG. 14 is a diagrammatic view showing the core sheet force balance during the blade formation process.

Viewing FIG. 14, a typical cell geometry is shown. An unbalanced force system in the X direction causes excessive material thinning which results in a blowout type failure. A balanced system is easy to achieve for the typical four sheet technique core arrangement because both edges of the Ti-Pack 10 are restrained from movement by the clamping pressure of the dies. As long as the roll seam weld spacing is equal the radii of the cells remain equal and the webs have no difficulty forming.

Difficulties in forming the inventive blade are present due to the unique seamless continuous leading edge design of the blade. Thus, the design includes the pair of outer core sheet sections 30, which have been wrapped back around 180° to form an additional pressure cell 48, 50 within the Ti-Pack 10. This permits all of the edges of the sheets to protrude out of only three sides of the forming die 12; at the blade trailing edge, the top, and the bottom. The leading edge therefore is continuous, having no seam. By adding this feature, the core sheets 14, 16 are no longer anchored at one end, therefore the balanced force system in the X direction is upset. To counteract this problem, each cell must be individually pressurized at its own rate to maintain equilibrium between the core sheet threes. Individual core cell pressurization also adds design flexibility by eliminating the criteria imposed by the fabrication physics, that dictate each cell must have the same weld spacing as the cell adjacent to it.

Figure 15:
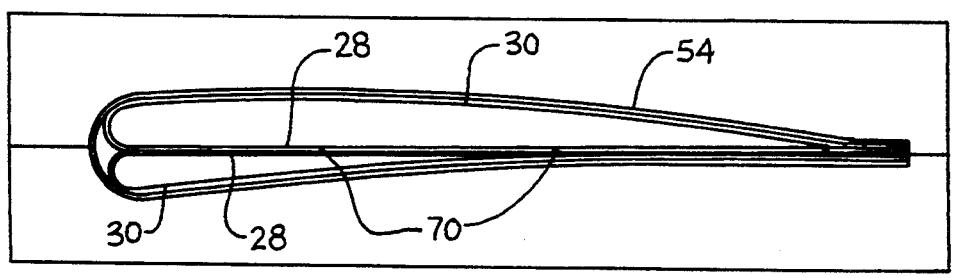
FIG. 15 is a cross-sectional elevational view similar to FIG. 10 showing the formation of the outer core sheet during the blade formation process.

Like the face sheet 54, the outer core sheet section's simplicity allows formation out to the face sheet at a fairly rapid rate. Once the outer core sheet section 30 has contacted the face sheet 54, as shown in FIG. 15, diffusion bonding will occur and movement within the forming die 12 will be restricted. As the leading edge side of the outer core sheets continues forming, the reaction vector for the internal core sheets increases as the forming angle flattens out to become parallel with the X axis. This reaction vector is held in place by the internal pressure of the outer core sheets and will provide a measurable force to react with one side of the inner core sheets at cell 42. The other side is reacted through cells 44 and 46 (best seen in FIG. 16) where that load is finally transmitted into the clamped trailing edge 72. As the pressure is increased in cell 42, it will expand and the force vector at the weld nugget 70 will decrease in the X direction and increase in the Y direction. Concurrently while this is taking place, pressures in cells 44 and 46 must be adjusted to balance the component forces in the X direction. As all three cells expand, as shown in FIG. 16, balancing the forces in the X direction becomes less important because the loads are decreasing and therefore the movement of the webs is less prevalent at this point in the forming cycle.

Figure 16:
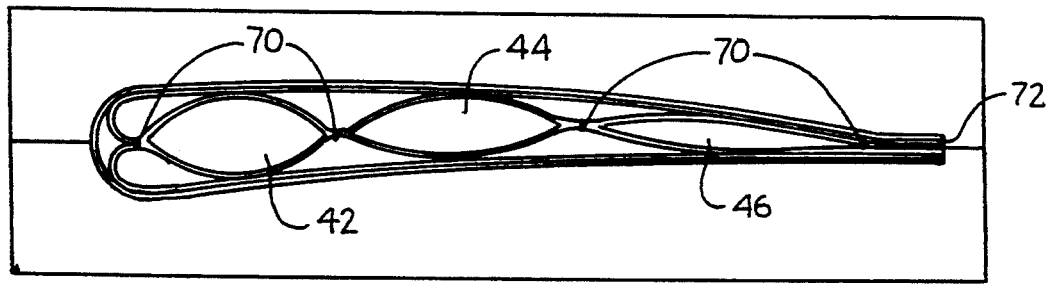
FIG. 16 is cross-sectional elevational view similar to FIG. 10 showing the initiation of the inner core sheet during the blade formation process.

Again viewing FIG. 16, formation of the internal core geometry continues until the inner core sheet sections 28 touch the outer core sheet sections 30 and the radius at the web/skin interface begins to close. Once the sheets come into intimate contact, the diffusion bonding cycle begins to promote grain growth across the material interface. Under these conditions of elevated temperature and pressure the intermetallic transfer of grain boundaries activates the solid state molecular bonding required for superior part strength and the elimination of stress concentrations caused by joining methods.

Figure 17:
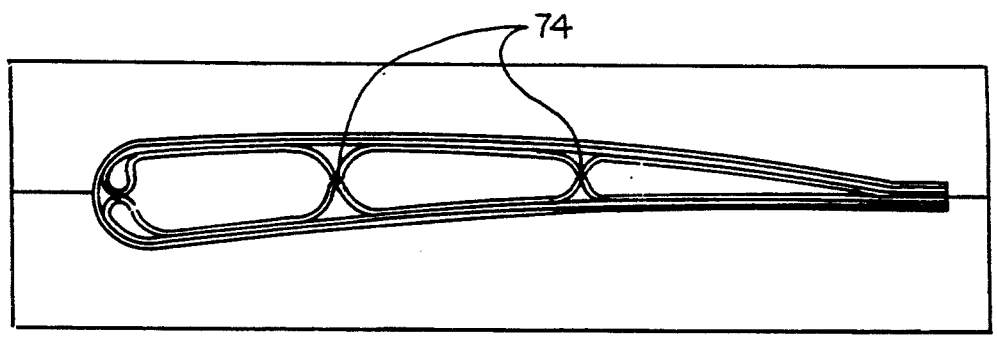
FIG. 17 is a cross-sectional elevational view similar to FIG. 10 showing the inner core sheet formation.

FIG. 17 shows an advanced stage of forming where the core sheet web radii begin to gradually grow smaller, and the core pressure can be incrementally increased because the flow stresses in the material are a function of the radius at any given pressure. In this stage, the inner core sheet sections 28 fold back over the weld nugget 70 and diffusion bond together. As the cell webs 74 become vertical and the corner radius decreases, the core pressure is elevated until a maximum of about 250 psi is reached. This will be the pressure differential between the two material interfaces that is required to diffusion bond the material and promote grain growth across the boundary. After holding this pressure condition and bumping the temperature up to about 1750° F. for two hours the diffusion bonding and forming portion of the hot forming operation are complete and the tool temperatures can be lowered.

The temperature at which the part is removed from the tool is a critical parameter because it has a tremendous impact on the final dimensional stability of the part. Due to the difference in thermal expansion coefficients of the steel die and the titanium part, the die will contract around the part as it cools. Since the part is still highly formable at elevated temperatures a careful analysis must be done to determine the overall machining factor used for the steel forming die. Typically the die is machined at a factor slightly less than 1.0.

Figure 18:
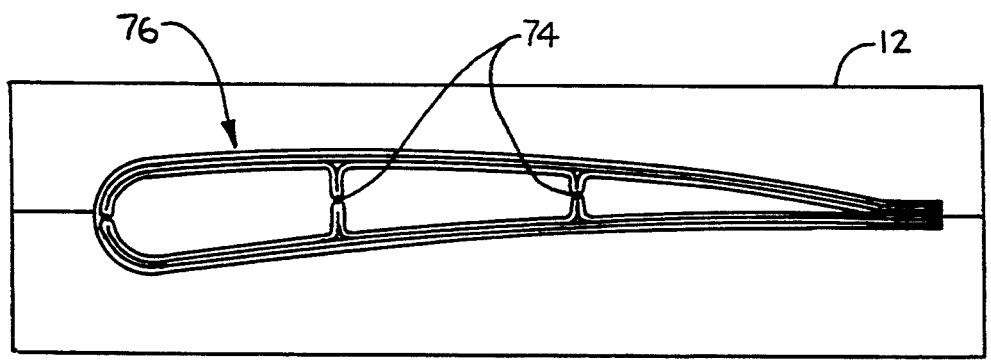
FIG. 18 is a cross-sectional elevational view similar to FIG. 10 showing the blade positioned within the die after diffusion bonding is complete.

The final part geometry is pictured in the steel die 12 in FIG. 18. A gradual cool down is required to maintain the thermal stability of the die. As the part temperature approaches about 1400° F. the modulus of the titanium becomes adequate to permit removal of the blade 76 from the die without damaging it. When the blade 76 is removed it should be placed in an insulated container to eliminate any warping condition that may be caused by preferential cooling of an exposed surface. The blade will now cool rapidly due to the large cooling area relative to its small mass. As the temperature nears 500° F., the gas inlet lines can be pinched off and welded closed. The hot forming operation is now complete.

Cleaning and Trimming Operation

During the SPF/DB cycle the Outer surface of the face sheet 54 is exposed to the atmospheric conditions present between the forming die surface 68 and the Ti-Pack 10. Titanium is a highly reactive material at temperatures above 1200° F. This causes it to soak up impurities that contaminate the surface and degrade the mechanical properties. To eliminate this contamination a chemical milling operation is used to remove 3 to 5 mils or so from the outer part surfaces. The "White Layer", as it is commonly referred to, is not present within the web passages of the finished component, because it only comes in contact with the inert gas during the fabrication phase at elevated temperatures. After chemical milling a final machining operation is required to trim the component edges down to their net dimensions.

Figure 19:
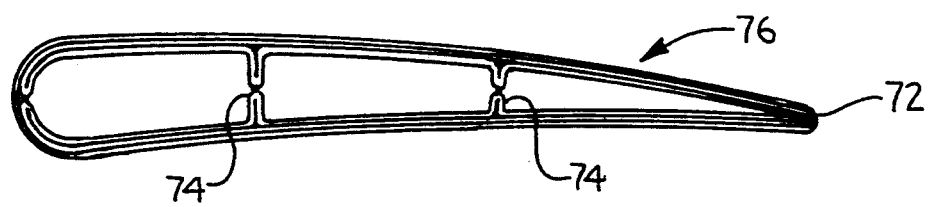
FIG. 19 is a cross-section of the trimmed fan blade as finally formed by the process of the invention.

A cross-section of the completed blade 76 is shown in FIG. 19 with the trailing edge 72 machined down to its final shape. Although the individual lines of the titanium sheets are shown in the figure, all the surfaces that contact one another are diffusion bonded together. Thus, the outer portion outer surface 30a for core sheet 14 is bonded to the face sheet first portion inner surface 54e, while the outer portion inner surface 30b is bonded to the inner portion outer surface 28a. Similarly, the outer portion outer surface 30a for the core sheet 16 is bonded to the face sheet second portion inner surface 54f. Each of the core sheet and face sheet ends are bonded together to form the trailing edge 72 of the blade. Therefore, the component will essentially react to the loading environment as a single piece of annealed titanium material.

The final operation to complete the fan blade assembly 78, as shown in FIG. 20, requires attaching the hollow blade body 76 to the solid machined root section 80. This is accomplished by fusion welding a butt type joint around the perimeter 82 where the two pieces come together.

Figure 21:
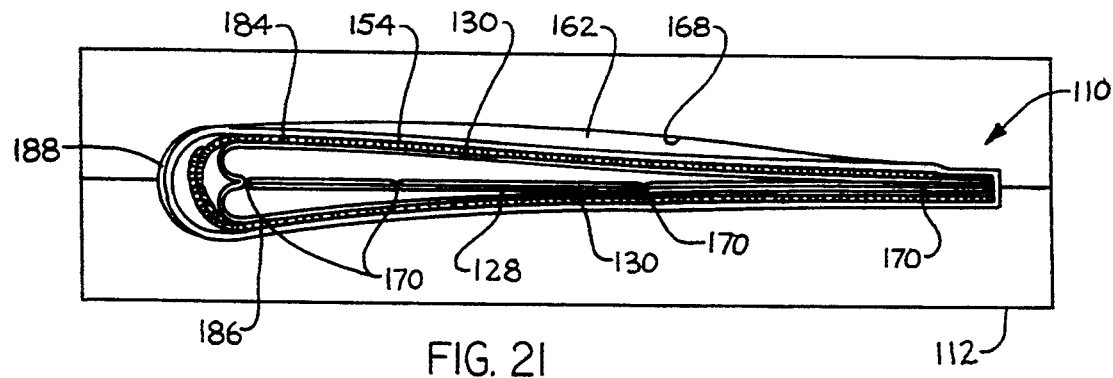
FIG. 21 is a cross-sectional elevational view similar to FIG. 10, showing an alternative embodiment.
Figure 22:
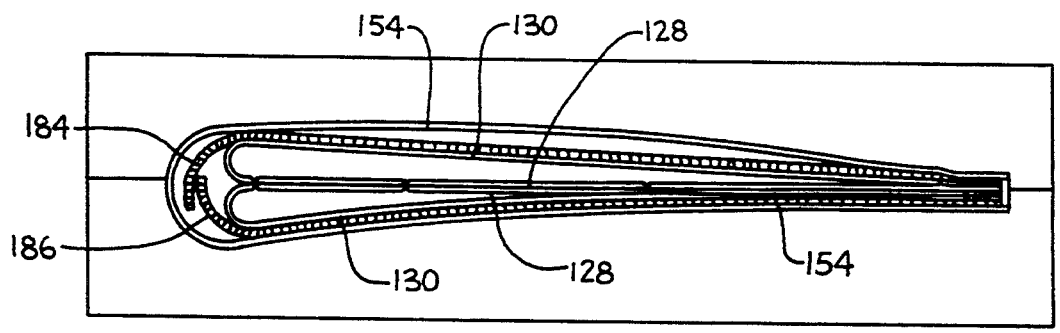
FIG. 22 is a cross-sectional elevational view similar to FIG. 13 showing the embodiment of FIG. 21 after formation of the face sheet.
Figure 23:
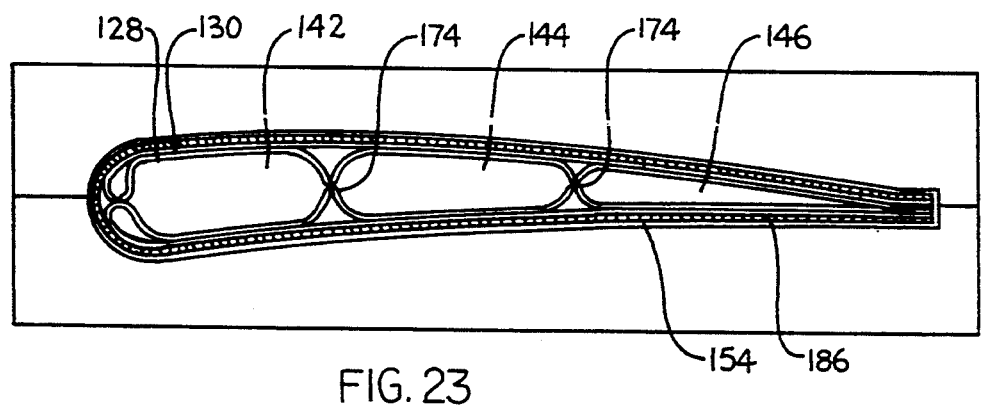
FIG. 23 is a cross-sectional elevational view similar to FIG. 16, showing the embodiment of FIG. 21 after initiation of the inner core sheet during the blade formation process.

Now referring to FIGS. 21-24, an alternative process for fabricating the inventive fan blade can be seen which is identical in all respects with that of FIGS. 1-19 except as described and shown herein. Each of the elements in FIGS. 21-24 corresponding to equivalent elements in FIGS. 1-19 are designated by the same reference numeral, preceded by the numeral 1. Thus, a modified Ti-Pack 110 is positioned inside a cavity 162 within a steel die 112. However, to improve the structural efficiency of the SPF/DB hollow core concept, a metal matrix skin design is incorporated. To do this, two individual silicon carbide fiber mats 184, 186 are added between the face sheet 154 and the outer core sheet sections 130 during the Ti-Pack build-up process, as shown in FIG. 21. The fibers run in the longitudinal direction and provide increased bending stiffness. The width of the fiber mats 184, 186 are cut so that they overlap one another at the leading edge 188. As the face sheet 154 is formed out to the tool surface 168, the fiber mats will start to uncurl as indicated in FIG. 22. The mats are then pushed out (strain-free) to the face sheet 154 by the outer core sheet section 130 as it begins to form. FIG. 23 shows the inner and outer core sheets 128 and 130, respectively, as they expand outward. The gas pressure is increased at this point to promote the consolidation of the fibers in the mats 184, 186. Over time and elevated temperature, the sheets will form a titanium metal matrix structure. The final blade configuration, shown in FIG. 24, looks identical to that of the first embodiment (FIG. 19) except that it will contain the silicon carbide fibers between the face sheet and the outer core sheet section.

FIGS. 25 and 26 show an alternative blade assembly 178 to that shown in FIG. 20, with a root section 180 which is more closely adapted to the SPF/DB hollow core concept. In the embodiment of FIG. 20, the root section 80 is a known solid root section, currently state of the art for solid fan blades. Thus, the hollow blade body 76 is welded to a solid root section 80. A much better approach, however, is to flare out the end of the rotor blade to form the root section 180, the hollow portion then being filled with a solid material filler such as a potting compound (epoxy filled 190, as shown in FIG. 26. A titanium slug or the like could also be used as the solid material filler. The root section 180 and the blade body 176 then become a homogeneous member, thus requiring no welding and providing an excellent means of load transfer through the root section into the blade retainer hub.

Although exemplary embodiments of the invention have been shown and described, many changes, modifications, and substitutions may be made by one having ordinary skill in the art without departing from the spirit and scope of the invention. Therefore, the scope of the invention is to be limited only in accordance with the following claims.

What is claimed is:

1. A method of fabricating a rotor blade for a turbine engine, comprising the steps of:
   a) preparing a core sheet assembly;
   b) preparing a face sheet having a first end and a second end, including the step of bending said face sheet at its centerline approximately 180 degrees, such that said first and second ends are aligned;
   c) inserting said core sheet assembly inside said prepared face sheet, thereby forming a Ti-Pack
   d) inserting said Ti-Pack into a cavity within a die; and
   e) superplastically forming a rotor blade having predetermined design characteristics by heating said die and selectively pressurizing a plurality of pressure-tight cells in said Ti-Pack, said plurality of cells including at least two core cells and at least one face sheet cell.

2. The method as recited in claim 1, wherein said core sheet assembly comprises first and second core sheets, each of said core sheets having first and second ends, the step of preparing said core sheet assembly further comprising the steps of:
   a) bending each said core sheet to form an L-shaped cross-section;
   b) placing said first and second core sheets back to back;
   c) rolling a grid pattern of intermittent spotwelds onto said sheets, thereby attaching said core sheets together and forming weld nuggets which function to dictate the final internal web geometry of the completed rotor blade;
   d) folding said core sheets back such that an approximately 180 degree bend is created in each said sheet wherein said first and second ends of each core sheet are aligned, each said core sheet thereby having an inner core sheet section and an outer core sheet section;
   e) installing at least one gas inlet into the interior of said core sheet assembly; and
   f) sealing the edges of said core sheets together, thereby creating a sealed core sheet assembly, which includes said at least two pressure-tight core cells.

3. The method as recited in claim 2, and further comprising the step of adding a silicon carbide fiber mat between said face sheet and each said outer core sheet section.

4. The method as recited in claim 2, wherein the step of inserting said core sheet assembly into said prepared face sheet includes the step of inserting a gas inlet into the face sheet and then sealing the edges of the Ti-Pack assembly, thereby creating said pressure-tight face sheet cell within which lies the sealed core sheet assembly.

5. The method as recited in claim 4, wherein the core sheets and the face sheet are made of the same SPF/DB-compatible material, the step of superplastically forming the rotor blade further comprising the steps of:
   a) increasing the temperature within the die to an ideal forming temperature for the sheet material;
   b) increasing the gas pressure in the face sheet cell as the temperature within the die is increased, thereby pushing said face sheet outwardly until it impacts the die surface surrounding said die cavity;
   c) increasing the gas pressure within the said at least two core sheet assembly core cells such that said core sheets wrap back around said weld nuggets, thereby forming a vertical or horizontal web in each said weld nugget location;
   d) forming the outer core sheet section of each core sheet out to said face sheet by selective pressurization of said core sheet cells; and
   e) forming the inner core sheet section of each core sheet out to the outer core sheet section for that sheet, such that the inner core sheet section and the outer core sheet section for each core sheet are in substantial contact and the outer core sheet sections of each core sheet are in substantial contact with opposing sections of said face sheet.

6. The method as recited in claim 5, and further comprising the step of selectively increasing the core pressure and temperature as the core sheet sections are formed out, thereby ensuring that the contacting surfaces of the face sheet and each of the core sheets will diffusion bond together properly.

7. The method as recited in claim 1, and further comprising the step of adding at least one composite fiber mat between said face sheet and said core sheet assembly.

* * * * *